July 13, 1954     R. M. WILCOX     2,683,636

AIR BEARING

Filed Nov. 12, 1949

Inventor
Roy M. Wilcox
by Douglas S. Johnson
Atty.

Patented July 13, 1954

2,683,636

UNITED STATES PATENT OFFICE 2,683,636

AIR BEARING

Roy M. Wilcox, Toronto, Ontario, Canada

Application November 12, 1949, Serial No. 126,758

9 Claims. (Cl. 308—9)

This invention relates to improvements in bearings in which the lubricating film between the bearing surfaces is a gas, usually compressed air, and hence hereinafter referred to as "air bearings." More particularly the invention is specifically concerned with parallel surface air bearings.

The principal object of the invention is to provide an air bearing free from vibration.

A further important object is to provide a parallel surface type air bearing having a good load capacity.

A still further object is to provide a parallel surface type of air bearing having a good stiffness factor that is a relatively high ratio of change of load to change in thickness of the lubricating film.

The principal feature of the invention resides in constructing an air bearing in which the air is delivered to the lubricating pressure film in a manner to prevent vibration and at the same time provide an air distribution throughout the film.

A further and important feature consists in constructing a parallel surface type air bearing with an air feed arrangement providing a restriction removed from the entrance of the system to the film to increase load capacity and stiffness factor.

These and other objects and features will be apparent from the following description having reference to the accompanying drawings, in which Figure 1 is an underside plan view of an air bearing constructed in accordance with this invention and employing a single central feed.

The advantages of air bearings are fully discussed in my co-pending application Serial No. 126,757, November 12, 1949.

The objection to previous air bearings, none of which, as far as I am aware, have been commercially successful, has been the vibration tendency of the bearing and the lack of adequate load capacity. The error in first air bearing concepts has been the requirement for an ample volume of air or air pocket to sustain the load or an ample number of supply passages for feed flow section to distribute air to the lubricating film. Both the size of air pocket and the total flow section contribute to and cause vibration in the bearing and the prior art has been silent on both these problems, and it is the specific object of this invention to eliminate these sources of vibration.

As explained in the said co-pending application, the volume of air in or connected without appreciable flow restriction with the air film is critical and cannot exceed a certain limit without causing vibration. This consideration is essentially eliminated in the "parallel" type bearings disclosed wherein the opposing bearing surfaces are everywhere substantially parallel. Thus in this type of bearing construction there is no contour providing air storage leading to vibration.

However, these parallel type bearings are still subject to vibration upon increasing the size or number of the feed passages leading to the film, as hereinafter explained.

Figure 1:
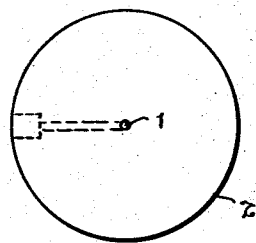
Figure 2:
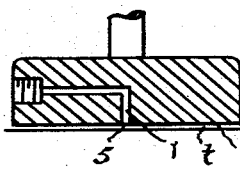
Figure 2 is a vertical mid-sectional view through the bearing of Figure 1.

Referring to Figure 1, the bearing illustrated is a central feed parallel type comprising the central feed passage 1 leading to the bearing surface 2 which, as shown in Figure 2, forms part of a thrust bearing having a parallel bearing surface 3. The volume of air in this film constitutes only the extent and thickness of the actual film between the parallel surfaces.

To provide a locating action to locate the bearing surfaces 2 and 3 a restriction must be formed between the film and the compressed air supply feeding the film through the passage 1. This restriction is actually constituted by the restricted area of flow section outwardly from the mouth of the passage 1. This flow section area is equal to the perimeter of the feed passage at the entrance to the film times the thickness of the film.

To provide a practical air bearing this restriction must permit sufficient flow to the film to provide pressure in the film. It also must not have sufficient volume itself to cause vibration and it must serve to isolate the air supply from the film also to prevent vibration.

Since the restriction is in one direction thickness of the film, the problem of storing a sufficient volume of air to cause vibration is not encountered. However, to sustain pressure in the film to obtain load capacity this restriction must be made as large as possible necessitating a feed passage of as large a diameter as possible, as the thickness of the film is exceedingly small. Increasing passage size introduces a source of vibration if the feed passage is increased beyond limits with respect to the extent of the film. This fact that the size of the feed passage or passages where the feed is not central as in Figure 1, is limited, has not heretofore been realized. A further understanding of this limit will be had from consideration of Figure 11.

Figure 11:
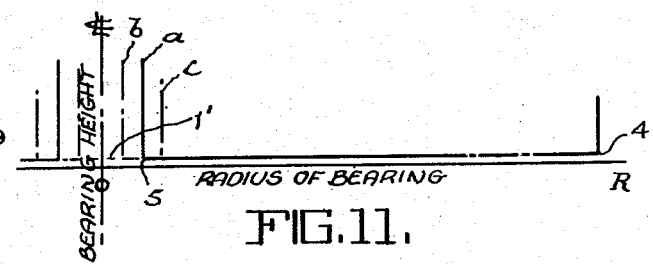
Figure 11 is a diagrammatic illustration showing the relationship between the feed passage and the air film to prevent vibration.

Figure 11 illustrates diagrammatically a parallel type bearing showing different passage sizes in dotted line relative the fixed passage size illustrated in solid line which represents the maximum permissible size of feed passage.

The criterion for determining the passage size may be considered as what I term the expansion ratio E and this is equal to the ratio of the sectional area of flow at the edge of the passage 1' defined by the perimeter of the passage and the thickness of the film, and the flow section at the edge of the bearing defined by the perimeter of the bearing and the film thickness at the perimeter i. e. the expansion ratio is the ratio of the flow section at the restriction limiting gas flow to the film under conditions of no loading and the flow section at the edge of the bearing.

In parallel type bearings of either the central or multiple hole feed type I have found that this expansion ratio must not exceed the value 1/11 i. e. the flow section at the restriction ahead of the film must never be greater than 1/11 of the flow section at the perimeter of the bearing (under no-load conditions).

By "perimeter of the bearing" is meant the perimeter of the film or film segment which the feed passage supplies as the bearing may be extended in any geometrical form and is supported by pressure differences in films or film segments on opposite sides thereof.

In Figure 11 the solid line $a$ represents the boundary of the feed orifice 1' providing maximum permissible expansion ratio E with respect to the edge of the bearing or film perimeter 4. The inner line $b$ represents the boundary of the feed passage which has a smaller expansion ratio within the limits of this invention, and $c$ represents the boundary of the feed passage or hole which provides an expansion ratio greater than 1/11 and causes vibration of the bearing.

The expansion ratio in effect is equivalent to the ratio of the perimeter of the feed passage 1' to the perimeter of the film as the film thickness is the same, both at the mouth of the feed passage 1 and the bearing edge in a parallel surface bearing.

Actually in air bearing constructions no volume or pocket of air can be included in or in unrestricted communication with the air film without leading to vibration of the film unless that volume or pocket is limited below that volume which causes vibration and limited below a volume which, if spread over the surface of the film, would give an increased film thickness of over $2 \times 10^{-3}$ inches.

With the parallel surface type of bearing no pockets are included by virtue of the parallelism of the surfaces. However, to increase flow distribution and to eliminate or lessen turbulence the corners of the feed passage 1 or 1' and indicated at 5 may be rounded and come within the meaning of my term "parallel bearings" provided the rounding of the corners does not include a volume of air in the film greater than the volume limitation above.

The load capacity of an air bearing is equal to the integral from zero to R of PdA where R represents the radius of the bearing or film. To provide loading, the feed passage 1 must supply pressure to the film and must supply pressure through this restriction formed by the corner 5 of this passage and the opposite bearing surface 2. Requirement for this restriction is also to isolate the air supply from the film to prevent vibration.

The bearing illustrated in Figures 1 and 2 is used where the load capacity required is small and where it is not desirable to filter the air supply delivered to the film by the feed passage 1. With the single-feed passage of Figures 1 and 2 the stiffness factor of the bearing, that is, the ability to resist change in film thickness for given load change is relatively small. The reason is that the restriction isolating the air supply from the film is, as explained, formed by the corner 5 of the passage and the opposite bearing surface and hence is dependent on the thickness of the film and changes with load, giving poor stiffness as fully explained in said co-pending application.

To increase bearing stiffness the passage 1 or passages 6 may be reduced in size to comprise or include a restriction ahead of the film. If these passages afford a restriction orifice ahead of the film such that the pressure in the film is less than .53 the pressure of the supply under all normal loads then the flow through the passages will be substantially constant independent of film pressure and hence film thickness. This constant mass flow conception for fixed supply pressure and orifice restriction as above is well understood in the art of pressure gas flow but has never to my knowledge been heretofore applied to air bearings to enable increased stiffness factor to be obtained.

While the load capacity and stiffness would appear to be very small in parallel type bearings, I have found that actually an appreciable load may be supported. I believe the explanation of this lies in the rapidly increasing viscous resistance in the film due to decreasing film thickness of the film under loading, for the viscous resistance varies as $$\frac{1}{t^3}$$

where $t$ is the film thickness. Thus under no or light load where $t$ is large the film space acts as a conducting expansion nozzle with the section flow area increasing with radius from centre of feed passage.

Where the bearing is loaded and $t$ is very small the film space, due to the greatly increased viscous resistance which has become important relative inertia, acts as a high resistance channel. As a nozzle the bearing has too high an expansion ratio and so the pressure drops below atmospheric inside the bearing. However, the resulting momentum is converted back into pressure before or as the air leaves the bearing. The conversion of momentum into pressure and the film space into a high resistance channel with small $t$ thus affords a pressure to support a load beyond that which has been expected of parallel surface bearings.

Figure 3:
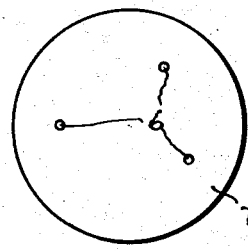
Figure 3 is an underside plan view of another form of bearing constructed in accordance with this invention and showing a plurality of distributed feed passages leading to the bearing surface.
Figure 4:
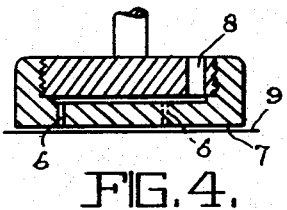
Figure 4 is a vertical mid-sectional view through the bearing of Figure 3.

Figures 3 and 4 illustrate a multi-hole parallel bearing wherein a plurality of feed passages 6 in parallel open through to one of the bearing surfaces 7 from the main supply passage 8. With this arrangement the compressed air is introduced at separate points into the film between the surface 7 and the opposing surface 9.

The distributed passage arrangement of this bearing facilitates distribution of the compressed air through the film, increasing load capacity. The expansion ratio of this bearing however must be maintained within the ratio limit of 1/11 and considering the perimeters involved the total or combined perimeter of the unrestricted feed passages 6 must not exceed 1/11 of the perimeter of the film which they supply.

By unrestricted, with reference to the multiple feed passages such as the passages 6, is meant a passage which permits a straight-line flow of compressed air towards the film for an appreciable distance before reaching the film. This definition is made to distinguish the parallel feed type of bearing of Figures 3 and 4 from the parallel feed type of bearing Figures 9 and 10 where the pressure air is delivered through a porous surface, the total perimeter of the feed passages of which are difficult to calculate and which have been found to operate satisfactorily as vibrationless air bearings. Actually the passages 6 may be so small in size that they themselves constitute a restriction relative the main feed passage 8 to in themselves isolate the compressed air supply from the film, so that the restriction to the air flow out to the film is not only at the corners of these feed passages 6 but in the passages themselves to increase the load capacity by providing a restriction that is not dependent on film thickness.

Figure 10:
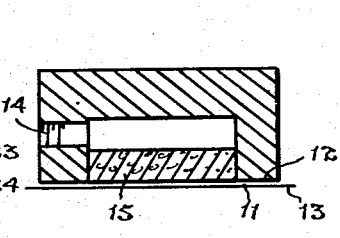
Figure 10 is a mid-vertical sectional view through a parallel surface type of bearing constructed in accordance with this invention and showing a central distributed feed by means of a central porous filter element.

In the bearing illustrated in Figure 10, the restriction between the film 11 separating the bearing surfaces 12 and 13 and the main supply passage 14 comprises the porous filter section 15. This filter section has the advantage that the compressed air is not only distributed throughout the film 11 but the restriction to the air flow into the film occurs actually ahead of the film due to the thickness of the porous section 15.

The distribution of the air at a plurality of points into the surface gives increased load capacity and the provision of the restriction ahead of the film gives a restriction which does not vary with film thickness and therefore gives a better stiffness factor, permitting a more accurate bearing to be obtained.

The filter section has a further advantage in that it cannot become plugged by a single foreign particle in the air supply.

The filter section may be any suitable porous material affording sufficient feed therethrough to sustain the film under load. Preferably this section is made from "Porex," which is a sintered metal and comprises a body made of small brass spheres of uniform size coated with tin and then slightly melted together after being pressed to a unitary or one-piece structure in a mould.

While ordinary sintered material does not pass sufficient air for a bearing of practical film thickness, it will be appreciated that specific sintered or porous material having increased porosity sufficient to supply a film may be used within the spirit of this invention.

With the bearing of Figure 10 the filter section provides the restriction required to eliminate vibration in a bearing.

As the total perimeter of the feed pores opening to the film 11 cannot be calculated accurately and since there are other factors possibly which I am unaware in the manner in which the air flow reaches the film, I cannot place a definite limit on the perimeter ratio of the filter and the film. However, this bearing comes within the definition that the total perimeter of the unrestricted flow passages opening to the film to the perimeter of the film is less than 1/11 as the pore passages through the sintered metal are definitely restricted within the meaning of the definition of restriction for the passages 6.

Either the single hole or multi-type parallel bearing or the porous type parallel bearing may be incorporated in any geometrical form of bearing design.

Figure 5:
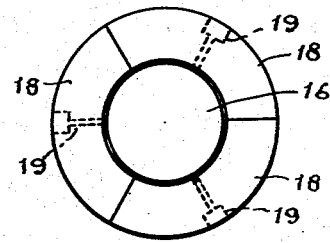
Figure 5 is a vertical sectional view of a radial bearing of the parallel surface type constructed in accordance with this invention.
Figure 6:
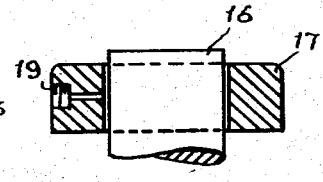
Figure 6 is a transverse section on the line 6—6 of Figure 5.

Figures 5 and 6 illustrate a radial bearing incorporating the central feed of the bearing of Figures 1 and 2. In this bearing the rotor 16 is located within the stator 17 by means of the pressure difference in the air film segments 18 supplied by the central feed passages 19.

For each section of the bearing the expansion ratio is less than 1/13, that is, equivalently, the ratio of the perimeter of the feed passage 19 at the film to the perimeter of the film segment which it supplies, is less than 1/11.

Figure 7:
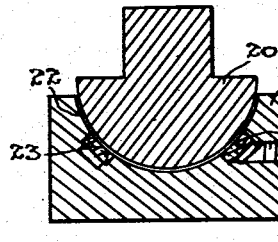
Figure 7 is a vertical sectional view of a parallel surface spherical bearing in which the compressed air feed to support the film between the surfaces is through an annular porous ring.

Figure 7 is a spherical type bearing where the rotor 20 and cup 21 are separated by the lubricating compressed air film 22 sustained by air feed through the porous annulus 23 communicating with the feed supply 24. This bearing constitutes a multi-type bearing in extreme, and it will be appreciated that due to the restriction afforded by the porous annulus 23 there will be film pressure differences at opposite sides of the bearing. This type of bearing is not to be confused with previously proposed bearing constructions wherein an annular groove is provided for distributing the air around the bearing. Such an annular groove arrangement fails because very little pressure difference can be established at opposite sides of the bearing to support the load.

Figure 8:
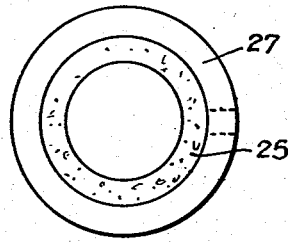
Figure 8 is an underside plan view of a plane or thrust bearing employing a peripheral feed channel of porous material.
Figure 9:
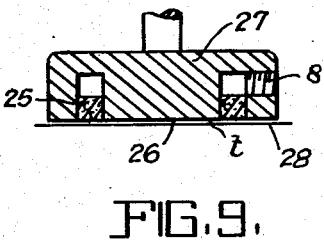
Figure 9 is a mid-vertical sectional view through the bearing of Figure 8.

Figures 8 and 9 illustrate a parallel surface bearing which may be a thrust bearing in which a peripheral porous annulus 25 is utilized to form the restriction and the means of distribution of the compressed air to the film 26 separating the bearing surfaces 27 and 28.

It will be understood that any combination of distribution means in any form of bearing are within the concepts of this invention where the distribution is effected and the size of feed passage or passages relative the film section they support is such to render the bearing vibrationless.

While turbulence is a factor leading to vibration and at light load the flow in the film in multi-hole bearings with parallel surfaces away from the holes will be turbulent tending to cause vibration and drop in pressure, as the bearing surfaces come together under load the hydraulic radius, which is proportional to the flow section at the perimeter of the holes, decreases. This causes turbulence to cease and the drop in pressuer near the holes will be less, thus spreading more pressure to the film and permitting a moderate load capacity even where the holes themselves are not sufficiently small to provide restriction ahead of the film.

It will be appreciated that my bearings may be incorporated into any type of machine or mechanism including machine ways, spindles, rotors or thrust bearings.

What I claim as my invention is:

1. An air bearing comprising a pair of parallel bearing surfaces separated by a continuous lubricating film of compressed gas, and means fed from a compressed gas supply distributing compressed gas free of foreign inelastic matter throughout said film to sustain said film continuous without vibration of said bearing, said means comprising a gas flow passage formation affording a restriction between said film and said supply and having a total perimeter opening into the film not greater than 1/11 of the perimeter of said film.

2. An air bearing comprising a pair of parallel bearing surfaces separated by a continuous lubricating film of compressed gas, feed means delivering compressed gas substantially free of inelastic foreign matter to said bearing from a compressed gas supply, and distributing means communicating with said feed means and delivering compressed air at a plurality of points to said film to distribute compressed gas throughout said film continuous to sustain said film under loading without vibration of said bearing, said distributing means comprising a gas flow formation affording a restriction between said film and supply and of a character to provide at the point of entry to the film no combination of unrestricted flow passages having a total perimeter exceeding 1/11 of the perimeter of said film.

3. An air bearing comprising a pair of parallel bearing surfaces separated by a continuous lubricating film of compressed air, feed passage means leading to at least one of said surfaces to distribute compressed air substantially free of inelastic foreign matter throughout said film, the feed passage means opening into said film and having a total perimeter limited to prevent vibration of said bearing and affording an expansion ratio not exceeding 1/11.

4. A multi-hole air bearing comprising a pair of parallel bearing surfaces separated by a continuous lubricating film of compressed air, a plurality of feed holes leading through one or more of said surfaces and communicating with said film and in communication with a compressed air supply to distribute compressed air substantially free of inelastic foreign matter throughout said film while maintaining said bearing free from vibration, the expansion ratio afforded by said feed holes with respect to said film being less than approximately 1/11.

5. In a gas bearing, a pair of parallel bearing surfaces separated by a continuous lubricating film of compressed gas, a network of feed passageways opening to at least one of said surfaces and in communication with a compressed gas supply to distribute compressed gas throughout said film, said network of feed passages comprising a porous surface providing a plurality of non-uniform restricted feed passages in parallel opening to said film and affording a restriction between said supply and said film but permitting flow to sustain said film under loading, the flow section of said restricted feed passages being limited to an expansion ratio of not less than 11 to 1 in respect to flow section at the edge of said film under no film load.

6. An air bearing comprising a pair of parallel surfaces separated by a continuous lubricating film of compressed gas, feed means delivering compressed gas to said bearing from a compressed gas supply, and distributing means communicating with said feed means and delivering compressed air substantially free of inelastic foreign matter to said film, said distributing means comprising a gas flow formation affording a restriction ahead of said film limiting pressure in said film to less than .53 of the pressure of said supply and providing a total perimeter at the point of entry to the film less than 1/11 of the perimeter of said film.

7. A gas bearing having a pair of parallel bearing surfaces separated by a continuous lubricating film of compressed gas, feed passage means leading to at least one of said surfaces to distribute compressed gas laterally to film flow to maintain said film continuous under bearing loading, said feed passage means including a distributed opening into said loaded film of a flow section at least essentially equal to that of the feed passage means, and said feed passage means having a flow section restricting gas flow to said film to avoid vibration, said restricted section being limited to an expansion ratio not less than 11:1 in relation to flow section at the edge of the bearing under no-load condition.

8. A gas bearing comprising a pair of parallel bearing surfaces separated by a continuous lubricating film or film segment of compressed gas, a feed passage network leading through one or more of said surfaces and communicating with said film and with a compressed gas supply, said feed passage network being symmetrically disposed with respect to said surfaces to introduce pressure gas to said film to provide substantially uniform film pressure under uniform load at corresponding points throughout said film to provide hydraulic balance in said bearing, said feed passage network having up to the entrance to said film a continuous reduced flow section independent of film thickness to restrict gas flow through said feed passage network to said film under no film load conditions and to maintain said bearing free from vibration, and said bearing surfaces providing a gas flow restriction under loading varying in accordance with their separation, said reduced flow section being limited to an expansion ratio of not less than 11 to 1 in respect to flow section at the edge of said film under no film load.

9. An air bearing comprising a pair of parallel bearing surfaces adapted to be lubricated by a film of compressed gas, a feed passage means adapted to deliver gas to said film from a compressed gas supply to sustain said film under load while maintaining said bearing free from vibration, said passage means having a distributed opening to said film and having a fixed flow section approaching said opening, said flow section being limited to an expansion ratio not less than 11 to 1 in respect to flow section at the edge of said film under zero load.

References Cited in the file of this patent

UNITED STATES PATENTS

| Number | Name | Date |
|---|---|---|
| 1,337,742 | Abbott | Apr. 20, 1920 |
| 1,634,768 | Bonner | July 5, 1927 |
| 1,906,715 | Penick | May 2, 1933 |
| 2,086,896 | Carter | July 13, 1937 |
| 2,352,958 | Lauer | July 4, 1944 |
| 2,442,202 | Hughes-Caley | May 25, 1948 |

FOREIGN PATENTS

| Number | Country | Date |
|---|---|---|
| 400,159 | Great Britain | 1933 |